United States Patent
Hasan et al.

(10) Patent No.: US 9,954,353 B2
(45) Date of Patent: Apr. 24, 2018

(54) SELF TURN-ON AND TURN-OFF PRE-CHARGE CIRCUIT TO LIMIT BULK CAPACITOR INRUSH CURRENT

(71) Applicant: GM Global Technology Operations LLC, Detroit, MI (US)

(72) Inventors: S. M. Nayeem Hasan, Novi, MI (US); Timothy P. Philippart, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 14/933,394

(22) Filed: Nov. 5, 2015

(65) Prior Publication Data

US 2017/0133837 A1    May 11, 2017

(51) Int. Cl.
*B60L 11/18*    (2006.01)
*H02H 9/00*    (2006.01)

(52) U.S. Cl.
CPC .......... *H02H 9/002* (2013.01); *B60L 11/1803* (2013.01); *H02H 9/001* (2013.01)

(58) Field of Classification Search
None
See application file for complete search history.

(56) References Cited

U.S. PATENT DOCUMENTS

| 2013/0162183 A1 | 6/2013 | Philippart | |
| 2015/0061376 A1* | 3/2015 | Hartl | B60R 16/02 307/9.1 |
| 2015/0069829 A1* | 3/2015 | Dulle | B60R 16/03 307/9.1 |
| 2015/0251542 A1* | 9/2015 | Mensah-Brown | B60L 11/005 307/10.1 |

* cited by examiner

*Primary Examiner* — Jared Fureman
*Assistant Examiner* — Aqeel Bukhari

(57) ABSTRACT

A pre-charge circuit is disclosed for a vehicle including a battery and a load. The pre-charge circuit includes a time delay circuit configured to, in response to receiving power from the battery, generate a first voltage. The first voltage increases from a first value toward a second value. The pre-charge circuit includes a switch control circuit configured to, in response to the first voltage, provide a second voltage that follows the first voltage. The pre-charge circuit includes a switching circuit configured to selectively connect the battery to the load based on the second voltage and disconnect the load from the battery in response to the second voltage reaching a predetermined threshold value. The pre-charge circuit includes an output circuit configured to restrict an amount of power and inrush current that is provided from the battery to the load through the switching circuit.

20 Claims, 4 Drawing Sheets

SELF TURN-ON AND TURN-OFF PRE-CHARGE CIRCUIT TO LIMIT BULK CAPACITOR INRUSH CURRENT

FIELD

The present disclosure relates to a pre-charge circuit designed to limit inrush current into a load.

BACKGROUND

When DC power is applied to a capacitive load, the capacitors initially draw a large amount of current before approaching a steady state value. Since the current of a capacitor is determined by the product of its capacitance and the rate of change in voltage with respect to time, the step response of input voltage will cause a large surge of current into the capacitor, referred to as inrush current. While inrush current may be limited by an equivalent series resistance of the capacitor, inrush current still can cause a considerable amount of stress on the capacitor and can cause the capacitor to fail prematurely.

Limiting inrush current is especially important for those applications that need to be turned on each time the device needs to be used, such as control systems in an automobile. An efficient inrush current limiter limits the inrush current during the startup transient but will not impact the transfer of power to the load under normal operation. This is critical for applications that need to be turned on each time the device is used, since repeated inrush currents can damage bulk capacitive loads.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A pre-charge circuit for a vehicle including a battery and a load includes a time delay circuit, a switch control circuit, a switching circuit, and an output circuit. The time delay circuit is configured to, in response to receiving power from the battery, generate a first voltage. The time delay circuit is also configured to allow the first voltage to increase from a first value toward a second value. The switch control circuit is configured to, in response to the first voltage, provide a second voltage that follows the first voltage. The switching circuit is configured to selectively connect the load to the battery based on the second voltage. The switching circuit is also configured to disconnect the load from the battery in response to the second voltage reaching a predetermined threshold value. The output circuit is configured to restrict an amount of power and inrush current that is provided from the battery to the load through the switching circuit.

The time delay circuit further includes a first resistor having a first resistance, a first capacitor having a first capacitance connected in series, and a time constant of the time delay circuit that is based on a product of the first resistance and the first capacitance. The time constant of the time delay circuit is between 10 milliseconds and 25 milliseconds.

The switch control circuit further includes a resistor network with an internal node that provides the second voltage and a voltage follower circuit connected between the first voltage and the resistor network. The voltage follower circuit further includes a PNP transistor with an emitter terminal connected to the resistor network and a base terminal that receives the first voltage.

The switching circuit further includes a MOSFET with terminals including a source terminal, a gate terminal, and a drain terminal; a turn-on voltage value, which is a voltage difference between the source terminal and the gate terminal that turns on the MOSFET; and the predetermined threshold value, which is a value of the second voltage that causes the voltage difference between the source terminal and the gate terminal to fall below the turn-on voltage value and consequently turn off the MOSFET. The switching circuit further includes a zener diode that prevents a voltage applied across two of the terminals of the MOSFET from exceeding a voltage rating of the MOSFET and a resistor connected between the gate terminal and the switch control circuit.

The output circuit is configured to prevent power from returning to the switching circuit from the load. The output circuit further includes a diode connected in series with a resistor and is connected in series between the switching circuit and the load.

In other features, the pre-charge circuit further includes the second voltage that reaches the predetermined threshold value prior to the first voltage reaching the second value. The first voltage is a voltage at a terminal of the first capacitor of the time delay circuit. The first value is approximately 0 volts and the second value is a voltage of the battery. The load includes at least one of a fuel pump, a three-phase motor, a boost power supply, an electronic control circuit, a powertrain control circuit, and a transmission control circuit.

In further features, a system includes the pre-charge circuit and a relay configured to selectively connect the battery to the load in response to a command from a microprocessor. The microprocessor receives power from the battery concurrently with the time delay circuit receiving power from the battery, and the microprocessor loads application software and subsequently sends the command to the relay. The system further includes a battery isolation switch configured to, in response to an ignition system of the vehicle turning on, connect the battery to the pre-charge circuit and to the microprocessor.

A method of charging a load using a pre-charge circuit includes generating a first voltage, connecting the battery to the load using a switch, and beginning to power up a microprocessor. The first voltage begins at a first value and increases toward a voltage of the battery. The method further includes generating a second voltage that follows the first voltage, restricting an amount of power and inrush current that is provided from the battery to the load, and disconnecting the load from the battery using the switch when the second voltage reaches a predetermined threshold value.

In other features, the method further includes generating a first voltage that is based on an analog circuit time constant, generating a second voltage that is a level-shifted version of the first voltage, and turning off the switch when the predetermined threshold value of the second voltage is reached. The method further includes closing a relay to connect the battery to the load in response to the power up and execution of application code of a microprocessor. The method further includes generating a first voltage configured such that the second voltage reaches the predetermined threshold value prior to the power up of the microprocessor being complete.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

In the drawings, reference numbers may be reused to identify similar and/or identical elements.

DETAILED DESCRIPTION

To mitigate inrush current, a variety of inrush current limiters have been used. A fixed resistor can be placed in series with the capacitive load to limit the inrush current flowing into the capacitors. However, this method is less efficient due to the power dissipation of the resistor as a function of the voltage drop across the resistor. This method essentially steals power from the load due to the power dissipation across the fixed resistor.

Negative temperature coefficient (NTC) thermistors, which are resistive devices that vary in resistance according to their temperature, have also been used. However, the NTC thermistor has inherent disadvantages due to the limited temperature range in which they can operate effectively and the inability to limit inrush current for successive power-ups of a circuit as a result of the time required to cool down the NTC thermistor between power-ups. Microprocessor-controlled inrush current limiters have been used to limit inrush current. However, microprocessor-controlled inrush current limiters have the disadvantage of requiring software intervention. Further, non-digital circuit implementations may be more cost-effective.

The present disclosure describes a self-turn on and turn-off pre-charge circuit that limits inrush current. As soon as a battery isolation switch turns on, the pre-charge circuit charges a load capacitance using an RC circuit, a switching circuit, and a buffer circuit. A predetermined charging duration is implemented in the RC circuit. After the charging duration has elapsed, the switching circuit disconnects a power supply from the load capacitance. After a microprocessor loads its application software, which takes longer than the charging duration implemented in the RC circuit, a powertrain relay will close in response to a command from the microprocessor. Consequently, the battery connects to the load capacitance through the powertrain relay and charges the load capacitance to the input voltage of the power supply. Utilizing the step response of the RC circuit in conjunction with the buffer circuit and the switching circuit, the amount of inrush current delivered to the load is significantly reduced.

Figure 1:
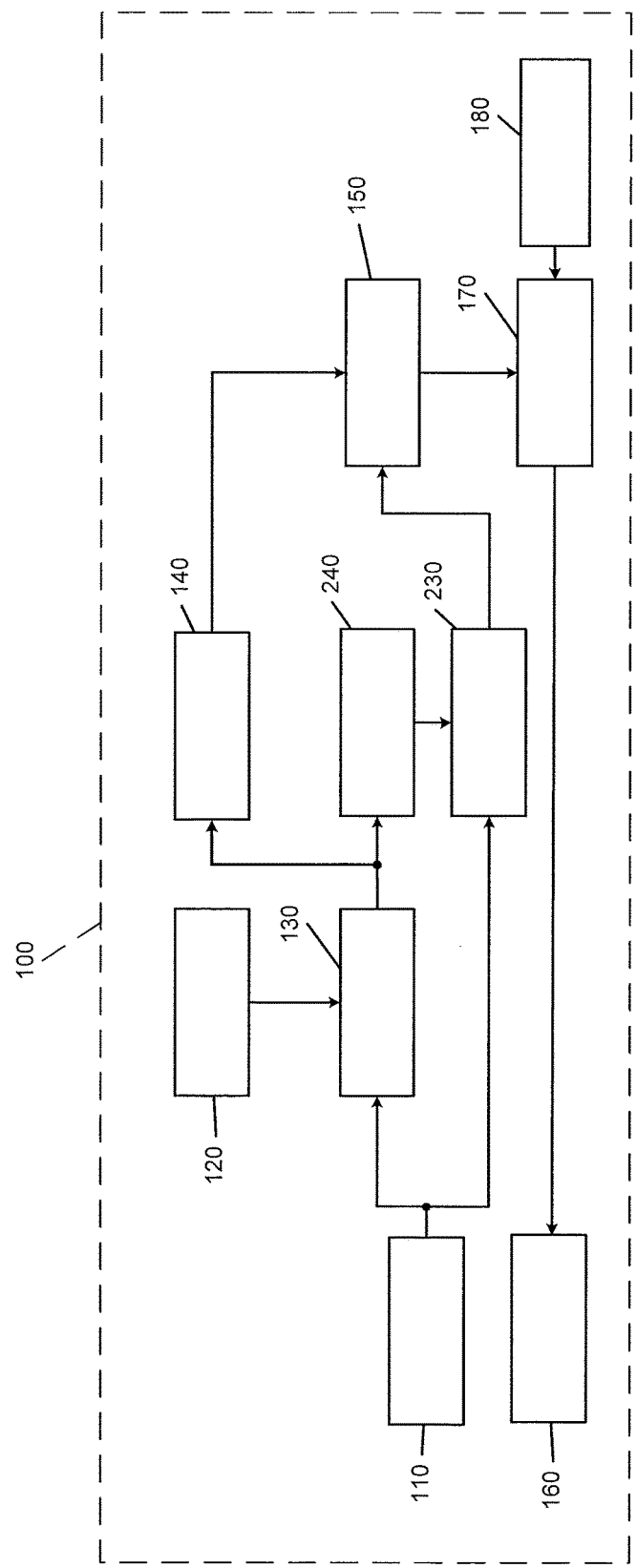
FIG. 1 is a high-level functional block diagram of a pre-charge circuit implemented in an automobile.

FIG. 1 is a high-level functional block diagram of a pre-charge circuit 140 implemented in the context of an automobile 100. In response to an ignition switch 120 being turned on, a controller area network (CAN) signal may be sent to a battery isolation switch 130 that causes the battery isolation switch 130 to connect a battery 110 to the pre-charge circuit 140. The battery 110 provides power to the pre-charge circuit 140 and a microprocessor 240 once the battery isolation switch 130 closes.

In various embodiments, the load includes bulk capacitors 150 and a fuel pump 170. Other loads may include a three-phase motor, a boost power supply, an electronic control circuit, a powertrain control circuit, and a transmission control circuit. Once the fuel pump 170 is provided with power, fuel from a fuel tank 180 may be delivered to an engine 180.

Once the pre-charge circuit 140 has provided power to the fuel pump 170 and the bulk capacitors 150 for a predetermined period of time, the pre-charge circuit 140 automatically turns off. After the pre-charge circuit 140 has turned off, the microprocessor 240 finishes initialization and loading of software, and sends a command to a powertrain relay 230 instructing the powertrain relay 230 to close. Through the closed powertrain relay 230, the battery 110 provides power to the bulk capacitors 150 and the fuel pump 170.

Figure 2:
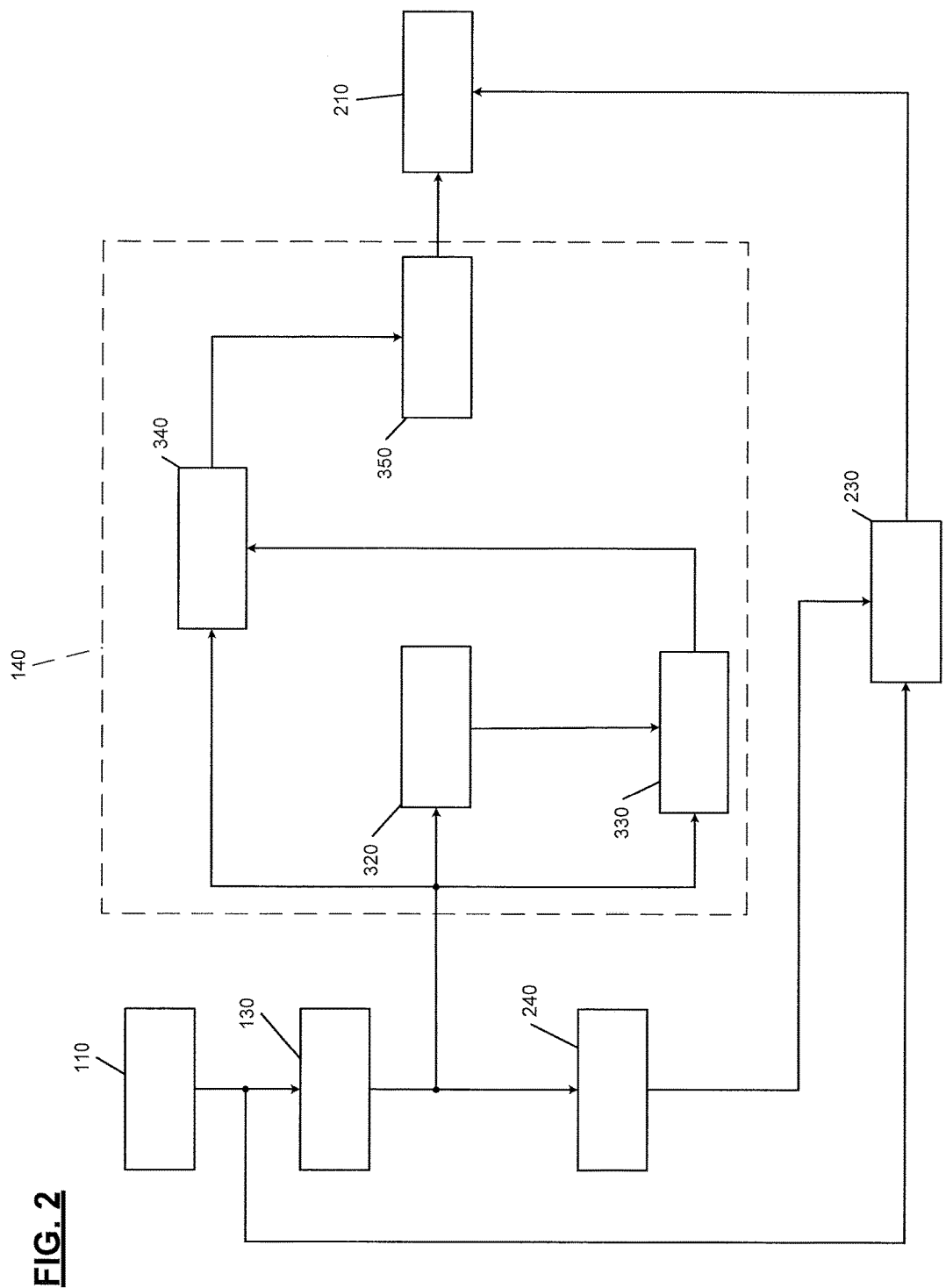
FIG. 2 is a high-level functional block diagram of the pre-charge circuit.

FIG. 2 is a high-level functional block diagram illustrating the function of the pre-charge circuit 140. The battery 110 provides power to the pre-charge circuit 140 and the microprocessor 240 when the battery isolation switch 130 closes. Once the pre-charge circuit 140 has provided power to the load 210 for a certain predetermined period of time, the pre-charge circuit 140 automatically turns off. After the pre-charge circuit 140 has turned off, the microprocessor 240 will send a command to the powertrain relay 230 to close the powertrain relay 230. Once the powertrain relay 230 is closed, the battery 110 resumes providing power to the load 210.

The pre-charge circuit 140 includes internal circuits that operate in conjunction with each other to provide power to the load 210 for a predetermined period of time. A time delay circuit 320, a switch control circuit 330, and a switching circuit 340 are all connected to the battery isolation switch 130 in parallel to the powertrain relay 230. The time delay circuit 320 sets the predetermined period of time that the pre-charge circuit 140 remains on before automatically turning itself off. The time delay circuit 320, in response to receiving power from the battery, provides a first voltage that increases from a first value toward a second value.

The switch control circuit 330, in response to the first voltage, provides a second voltage that follows the first voltage. The switching circuit 340 selectively connects the battery 110 to the load 210 based on the second voltage and disconnects the load 210 from the battery 110 based on the second voltage reaching a predetermined threshold value. The predetermined threshold value depends on the selection of a switch 446. An output circuit 350 restricts the amount of power and inrush current that is provided from the battery 110 to the load 210 through the switching circuit 340.

Figure 3:
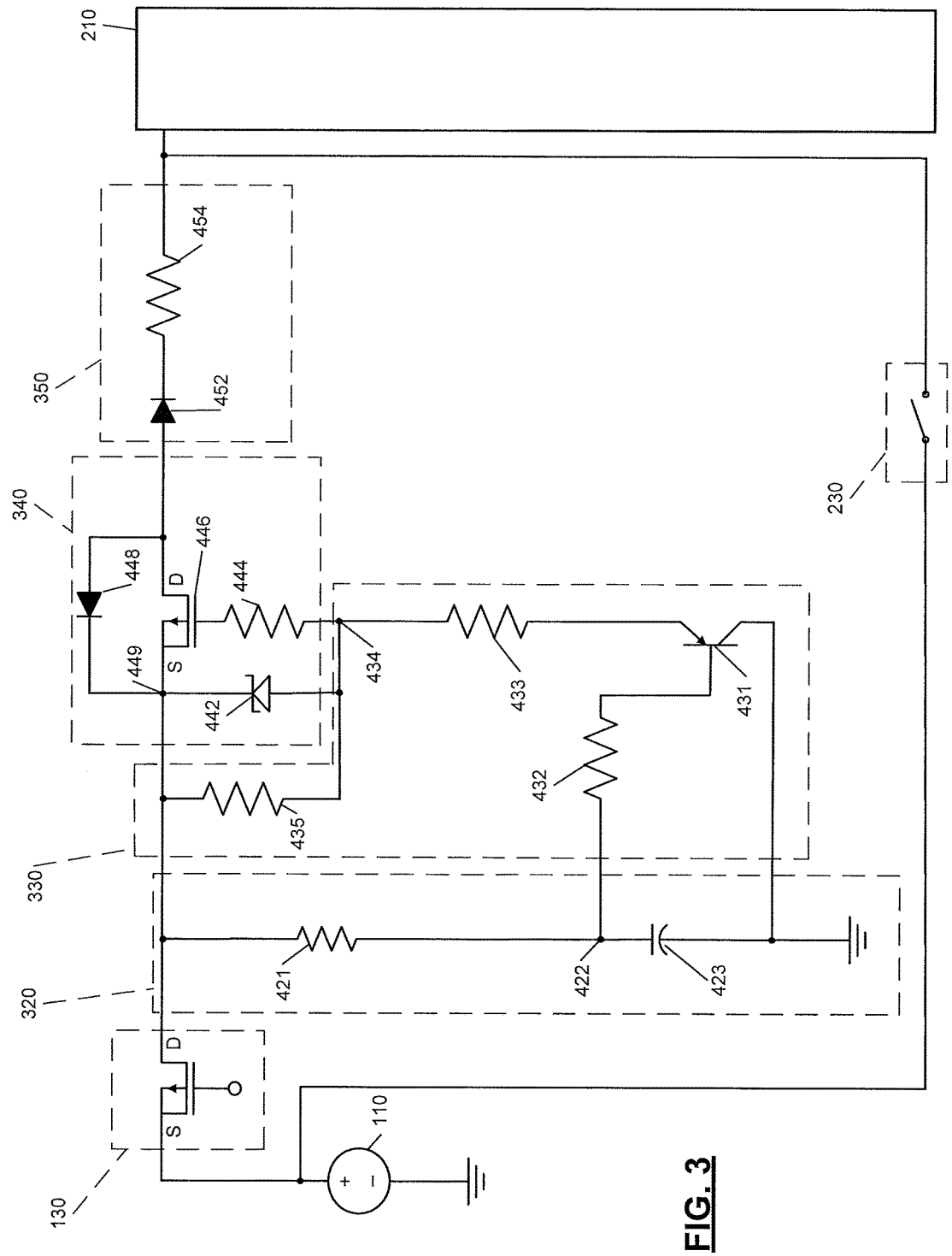
FIG. 3 is a circuit diagram of the pre-charge circuit.

FIG. 3 is a circuit schematic of an example implementation of a pre-charge circuit. The battery isolation switch 130 includes a relay, a field effect transistor, or a bipolar transistor to act as a switch. In various embodiments, a depletion-mode P-channel MOSFET is used as the switch and connects the battery 110 to the pre-charge circuit 140 and the load 210. A MOSFET may be preferable to a bipolar transistor, which requires a biasing current at its base. In various embodiments, the turning on and turning off of the battery isolation switch 130 may be controlled by a CAN signal. In various embodiments, a source terminal of the P-channel MOSFET may be connected to a positive terminal of the battery 110, and a drain terminal of the P-channel MOSFET may be connected to the pre-charge circuit 140.

The time delay circuit 320, in response to receiving power from the battery, provides a first voltage that increases from a first value toward a second value. In various embodiments, the first value may be 0V and the second value may be a voltage of the battery.

In various embodiments, the time delay circuit 320 includes a first resistor 421 with a first end connected to the battery isolation switch 130 and an opposite end connected to a first terminal of a first capacitor 423. An opposite terminal of the first capacitor 423 is connected to a grounded terminal of the battery 110. Since the first resistor 421 and the first capacitor 423 are connected in series, the time delay circuit 320 is an RC network. A rate of charging of the RC network is the time constant of the time delay circuit 320, which is based on the product of a resistance of the first resistor 421 and a capacitance of the first capacitor 423 ($\tau=RC$).

In the pre-charge circuit 140, the time constant determines how long the pre-charge circuit 140 remains on before automatically turning itself off. The voltage across the first capacitor 423 may take 1.7 to 2 time constants to reach 80% to 85% of the battery voltage. After 1.7 to 2 time constants have elapsed, the second voltage required to reach the turn-off threshold voltage of the switching circuit 340 may be reached, depending on a battery voltage value.

In various embodiments, the first resistor 421 may have a resistance R=50 k$\Omega$ and the first capacitor 423 may have a capacitance C=130 nF. Thus, the time constant of the time delay circuit 320 is 6.5 milliseconds, and 1.7 time constants equals 11 milliseconds. However, additional electrical components, such as the switch control circuit 330, may be connected in parallel to the RC network. Therefore, the amount of current flowing into the first capacitor 423 increases by a very small amount due to the base current of a PNP transistor 431. Thus, the actual time the pre-charge circuit 140 remains on may be slightly less than 11 milliseconds. However, the predetermined charging period may be in the range of 10 to 25 milliseconds to optimize the size of the switching circuit 340 and the output circuit 350.

The time delay circuit 320 generates the first voltage at node 422, which is between the first capacitor 423 and the first resistor 421. When power is applied to the pre-charge circuit 140, the first voltage begins increasing from zero to the battery voltage in a logarithmic manner.

The switch control circuit 330, in response to the first voltage, provides a second voltage at node 434 that follows the first voltage. The switch control circuit 330 includes a resistor network that provides the second voltage 434 and a voltage follower circuit that drives the resistor network. In various embodiments, the voltage follower circuit is an emitter-follower circuit, with the PNP transistor 431 including a collector terminal connected to a ground terminal and a base terminal connected to a fourth resistor 432. The fourth resistor 432 has an opposite end connected to the positive terminal of the first capacitor 423. An emitter terminal of the PNP transistor 431 is connected to the voltage divider network. In other embodiments, the fourth resistor may be removed, and the base of the PNP transistor 431 may be directly connected to the first voltage $V_B$ 422.

As the voltage of the first capacitor 423 increases, the voltage of the base terminal of the PNP transistor 431 increases as well. With the emitter terminal of the PNP transistor 431 following the voltage of the base terminal of the PNP transistor 431 due to an approximately 0.7V potential across a P-N junction of the emitter and base terminals of the PNP transistor 431, the emitter terminal voltage increases as the first voltage increases. Due to these emitter-follower circuit characteristics, the voltage of the emitter terminal acts as a voltage level shifter, where the voltage of the emitter terminal will be approximately 0.7V higher than the voltage of the base terminal.

The resistor network includes a second resistor 435 with one end connected to the battery isolation switch 130 and an opposite end connected to one end of a third resistor 433. The opposite end of the third resistor 433 is connected to the emitter terminal of a PNP transistor 431. The second resistor 435, which is connected in parallel to a zener diode 442, creates a smooth differential voltage between a gate terminal and a source terminal of a MOSFET 446. The third resistor 433 limits the current going through the PNP transistor 431 and the zener diode 442. The second and third resistors 435 and 433 act as a voltage divider in the switch control circuit 330 when a voltage across the zener diode 442 is below a clamping voltage ($V_{434}=V_{PNP\_emitter}+(V_{batt}-V_{PNP\_emitter})*R_{433}/(R_{433}+R_{435})$).

The third resistor 433 may be chosen such that it can limit current through the PNP transistor 431 and the zener diode 442 when the voltage across the zener diode 442 reaches the clamping voltage. The ratio of the second resistor 435 and the third resistor 433 may be chosen such that the voltage difference between the PNP transistor 431 emitter terminal and the node 434 is very small. As the voltage at the node 434 follows the voltage at node 422 with a small difference, the MOSFET 446 turns off after the time delay circuit 320 has charged to a certain level. A turn-on voltage value of the MOSFET 446 is a value of a difference in a gate terminal voltage and a source terminal voltage below which the MOSFET 446 stops conducting.

As an example, a DC voltage of 13.5V may be present on the battery 110, and the second resistor 435 may have a resistance value of 33 k$\Omega$, and the third resistor 433 may have a resistance value of 1 k$\Omega$. At the moment the battery isolation switch 130 provides power to the pre-charge circuit 140, the BJT 431 is on and conducting, and the voltage across the second resistor 435 is approximately the zener diode 442 clamping voltage ($V_Z$), making the voltage at node 434 approximately 13.5V-$V_Z$.

The zener diode 442 protects the MOSFET 446 gate terminal from overvoltage, and may be chosen based on the MOSFET 446 gate terminal voltage rating. Thus, the voltage difference between the gate terminal and the source terminal of the MOSFET 446 will not exceed the zener diode 442 clamping voltage $V_Z$. The voltage at the source terminal (node 449) of the MOSFET 446 meanwhile is 13.5 V. The difference between the gate and source voltage of the MOSFET 446 is above the turn-on voltage threshold, and the MOSFET 446 will remain on until the difference between the gate and source voltage falls below the turn-on voltage threshold.

As the first capacitor 423 charges, the first voltage at node 422 increases. With this voltage being applied to the base terminal of the PNP transistor 431, the emitter terminal of the PNP transistor 431 also increases. The gate voltage of the MOSFET 446 therefore approaches the source voltage of the MOSFET 446. The difference between the gate voltage and the source voltage will decrease below the turn-on threshold and consequently turn off the MOSFET 446.

In various embodiments, the switching circuit 340 includes the zener diode 442 connected in parallel to the second resistor 435, with a cathode end connected to the battery isolation switch 130 and an anode end connected to the opposite end of the second resistor 435. A fifth resistor 444 may be connected between the anode end of the zener diode 442 and the gate terminal of the MOSFET 446. The MOSFET 446 may be a P-channel MOSFET due to is low on-resistance. The MOSFET 446 has a source terminal connected to the cathode end of the zener diode 442 and a drain terminal connected to the output circuit 350. An intrinsic body diode 448 of the MOSFET 446 is present between the drain and source terminals of the MOSFET 446.

As the voltage of the first capacitor 423 increases, the voltage of the base terminal of the PNP transistor 431 increases as well. With the emitter terminal of the PNP transistor 431 following the voltage of the base terminal due to an approximately 0.7V potential across a P-N junction of the base and emitter, the emitter terminal voltage increases in keeping with the first capacitor 423 voltage. With the gate terminal of the MOSFET 446 being connected to the emitter terminal of the PNP transistor 431 through the third resistor 433, the voltage at the gate terminal of the MOSFET 446 increases as a result of the emitter terminal voltage increasing. As the voltage at the gate terminal of the MOSFET 446 (node 434) increases, the difference between the source terminal voltage and the gate terminal voltage of the MOSFET 446 decreases and approaches a minimum turn-on voltage value. Once the voltage difference goes below the minimum turn-on voltage of the MOSFET 446 as a result of the increasing gate terminal voltage, the MOSFET 446 turns off and cuts off power to the load 210.

The output circuit 350 is configured to restrict an amount of power that is provided to the load 210 from the battery 110 through the pre-charge circuit 140. The output circuit 350 is configured to prevent power from returning to the switching circuit 340 from the load 210.

In various embodiments, the output circuit 350 may be connected in series between the switching circuit 340 and the load 210. In various embodiments, a diode 452 may be connected in series with a sixth resistor 454. The diode 452 has an anode end connected to the drain terminal of the MOSFET 446 and a cathode end connected to the sixth resistor 454.

The sixth resistor 454 restricts the amount of inrush current delivered to the load 210. The sixth resistor 454 may be chosen so that a compromise exists between a restriction of the amount of power provided to the load 210 and the increased power loss of the output circuit 350 with the addition of the sixth resistor 454. The diode 452 may be implemented to prevent power from returning to the switching circuit 340 from the load 210. The sixth resistor 454 may be chosen based on a charging period, pulse power rating of the resistor and inrush current capability of the load 210.

Figure 4:
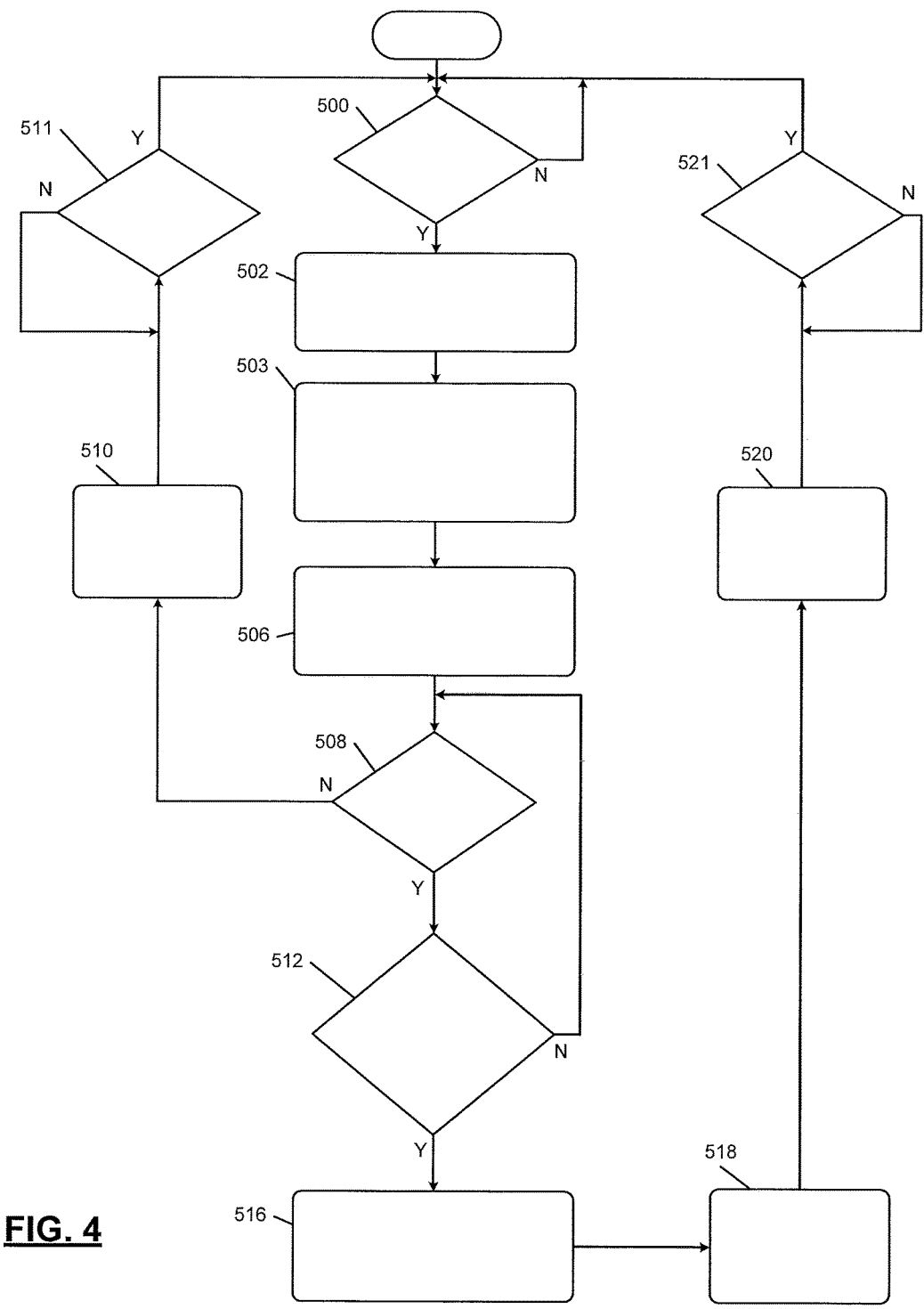
FIG. 4 is a flowchart illustrating example operation of the pre-charge circuit.

FIG. 4 is a flowchart illustrating example operation of the pre-charge circuit 140. Control begins at 500, where control determines whether the ignition switch is turned on. If so, control continues at 502; otherwise, control returns to 500.

At 502, based on the ignition switch being on (for example, as indicated by a CAN message) control closes the battery isolation switch and connects the battery to the pre-charge circuit and the microprocessor. Control continues at 503, where the microprocessor begins powering up and a time delay circuit is initiated. Control at 503 also closes the switching module of the pre-charge circuit to connect the battery to the load. Control continues at 506, where the output voltage of a switch control circuit follows the output voltage of the time delay circuit.

Control continues at 508, where control determines if the battery isolation switch is still closed. If the battery isolation switch is open, control continues to 510, where the battery is disconnected from the pre-charge circuit. Control at 511 determines if the ignition switch is turned off. If so, control returns to 500; otherwise, control returns to 511 and waits for the ignition switch to be turned off.

If control at 508 determines that the battery isolation switch is still closed, control continues at 512. Control at 512 determines whether the output voltage of the switch control circuit is greater than the predetermined threshold voltage that turns off the pre-charge circuit. If control at 512 determines that the output voltage has reached the threshold voltage, control continues at 516; otherwise, control returns to 508.

At 516, control opens the switching circuit and disconnects the battery from the load. At 518, the microprocessor has finished loading the application software necessary to close the powertrain relay. At 520, control closes the powertrain relay and connects the battery to the load through the relay. Control at 521 determines if the ignition switch is turned off. If so, control returns to 500; otherwise, control returns to 521 and waits for the ignition switch to be turned off.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between circuit) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

The term "circuit" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); or a combination of some or all of the above, such as in a system-on-chip.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A pre-charge circuit for a vehicle including a battery and a load, the pre-charge circuit comprising:

an analog time delay circuit configured to, in response to receiving power from the battery, generate a first voltage, wherein:
the first voltage continuously increases from a first value toward a second value; and
the second value is based on a voltage of the battery;
a switch control circuit configured to, in response to the first voltage, provide a second voltage that remains offset from the first voltage as the first voltage continuously increases from the first value toward the second value;
a switching circuit configured to (i) selectively connect the load to the battery based on the second voltage and (ii) disconnect the load from the battery in response to the second voltage reaching a predetermined threshold value, wherein the predetermined threshold value is less than the battery voltage; and
an output circuit configured to restrict an amount of power and inrush current that is provided from the battery to the load through the switching circuit.

2. The pre-charge circuit of claim 1, wherein the load includes at least one of a fuel pump, a three-phase motor, a boost power supply, an electronic control circuit, a powertrain control circuit, and a transmission control circuit.

3. The pre-charge circuit of claim 1, wherein the second voltage reaches the predetermined threshold value prior to the first voltage reaching the second value.

4. The pre-charge circuit of claim 1, wherein:
the first value is approximately 0 volts;
the second value is a voltage of the battery; and
the first voltage logarithmically increases from the first value toward the second value while the pre-charge circuit is providing power to the load.

5. The pre-charge circuit of claim 1, wherein the output circuit is configured to prevent power from returning to the switching circuit from the load.

6. The pre-charge circuit of claim 5, wherein:
the output circuit comprises a diode connected in series with a resistor; and
the output circuit is connected in series between the switching circuit and the load.

7. A system comprising:
the pre-charge circuit of claim 1; and
a relay configured to selectively connect the battery to the load in response to a command from a microprocessor.

8. The system of claim 7 further comprising the microprocessor, wherein:
the microprocessor receives power from the battery concurrently with the analog time delay circuit receiving power from the battery, and
the microprocessor loads application software and subsequently sends the command to the relay.

9. A system comprising:
the pre-charge circuit of claim 1; and
a battery isolation switch configured to, in response to an ignition system of the vehicle turning on, connect the battery to the pre-charge circuit and to a microprocessor.

10. The pre-charge circuit of claim 1, wherein the analog time delay circuit comprises:
a first resistor having a first resistance; and
a first capacitor having a first capacitance and connected in series,
wherein a time constant of the analog time delay circuit is based on a product of the first resistance and the first capacitance.

11. The pre-charge circuit of claim 10, wherein the first resistance and the first capacitance are selected such that the time constant of the analog time delay circuit is between 10 milliseconds and 25 milliseconds.

12. The pre-charge circuit of claim 1, wherein the first voltage is a voltage at a terminal of a first capacitor of the analog time delay circuit.

13. The pre-charge circuit of claim 1, wherein the switch control circuit comprises:
a resistor network with an internal node that provides the second voltage; and
a voltage follower circuit connected between the first voltage and the resistor network.

14. The pre-charge circuit of claim 13, wherein the voltage follower circuit comprises:
a PNP transistor with an emitter terminal connected to the resistor network,
wherein the PNP transistor includes a base terminal that receives the first voltage.

15. The pre-charge circuit of claim 1, wherein:
the switching circuit comprises a MOSFET with terminals including a source terminal, a gate terminal, and a drain terminal;
a turn-on voltage value is a voltage difference between the source terminal and the gate terminal that turns on the MOSFET; and
the predetermined threshold value is a value of the second voltage that causes the voltage difference between the source terminal and the gate terminal to fall below the turn-on voltage value and consequently turn off the MOSFET.

16. The pre-charge circuit of claim 15, wherein the switching circuit further comprises:
a zener diode that prevents a voltage applied across two of the terminals of the MOSFET from exceeding a voltage rating of the MOSFET; and
a resistor connected between the gate terminal and the switch control circuit.

17. A method for charging a load using a pre-charge circuit, the method comprising:
in response to receiving power from a battery, generating a first voltage, connecting the battery to the load using a switch, and beginning to power up a microprocessor, wherein the first voltage begins at a first value and continuously increases toward a voltage of the battery;
generating a second voltage, wherein:
the second voltage remains offset from the first voltage as the first voltage continuously increases from the first value toward the battery voltage;
restricting an amount of current that is provided from the battery to the load; and
in response to the second voltage reaching a predetermined threshold value, disconnecting the load from the battery using the switch, wherein the predetermined threshold value is less than the battery voltage.

18. The method of claim 17 wherein:
the first voltage is based on an analog circuit time constant,
the predetermined threshold value of the second voltage causes the switch to turn off, and
generating the first voltage includes increasing the first voltage logarithmically from the first value toward the battery voltage while the pre-charge circuit is charging the load.

19. The method of claim 17 further comprising, after power up of the microprocessor is complete, closing a relay to connect the battery to the load in response to application code executed by the microprocessor.

20. The method of claim 19 wherein the generating the first voltage is configured such that the second voltage reaches the predetermined threshold value prior to the power up of the microprocessor being complete.

\* \* \* \* \*